United States Patent [19]
Snider, Jr. et al.

[11] Patent Number: 5,969,292
[45] Date of Patent: Oct. 19, 1999

[54] OVERHEAD CABLING SYSTEM FOR TELECOMMUNICATION SWITCHING CENTER

[75] Inventors: Randle P. Snider, Jr., Plano; Stephen L. Wester, Wylie; Richard L. Thorne, Dallas, all of Tex.

[73] Assignee: Ericsson, Inc., Research Triangle Park, N.C.

[21] Appl. No.: 08/966,044

[22] Filed: Nov. 7, 1997

[51] Int. Cl.$^6$ .................................................. H02G 3/04
[52] U.S. Cl. .......................... 174/48; 174/95; 52/220.7; 361/826; 439/715
[58] Field of Search .............................. 174/48, 49, 68.1, 174/68.3, 95, 97, 99 R, 100, 101; 52/220.7, 220.8, 287.1; 248/49, 68.1; 361/826, 827, 829; 439/210, 215, 715, 716

[56] References Cited

U.S. PATENT DOCUMENTS

| | | | |
|---|---|---|---|
| 3,403,220 | 9/1968 | Riedel et al. | 174/101 |
| 3,633,628 | 1/1972 | Duquette | 138/116 |
| 3,713,613 | 1/1973 | Searls . | |
| 3,761,603 | 9/1973 | Hays et al. | 174/101 |
| 4,166,195 | 8/1979 | Schwab | 174/95 |
| 4,320,261 | 3/1982 | Scerbo et al. . | |
| 4,990,722 | 2/1991 | Benito Navazo | 174/97 |
| 5,271,585 | 12/1993 | Zetena, Jr. | 248/49 |
| 5,359,143 | 10/1994 | Simon | 174/101 |
| 5,580,014 | 12/1996 | Rinderer | 248/49 |
| 5,792,992 | 8/1998 | Handler | 174/101 |

FOREIGN PATENT DOCUMENTS

| | | |
|---|---|---|
| 2 322 503 | 8/1976 | France . |
| 2 651 386 | 8/1989 | France . |

*Primary Examiner*—Dean A. Reichard
*Assistant Examiner*—Dhiru R Patel
*Attorney, Agent, or Firm*—Coats & Bennett, PLLC

[57] ABSTRACT

An overhead cabling system for a telecommunications switching center including one or more cable chute assemblies, a plurality of cable tray assemblies, and one or more cable ladder assemblies. The cable chute assemblies are mounted to the floor adjacent the ends of the cabinet suites. The cable ladder assemblies are supported by the cable chute assemblies and extend cross aisle between two or more cabinet suites. The cable tray assemblies are mounted to the tops of the cabinets which provide the sole support for the cable tray assemblies. The cable tray assemblies are modular and designed to fit on top of a single cabinet. The overhead cabling system does not require support from the walls or ceiling of the telecommunications center.

8 Claims, 8 Drawing Sheets

OVERHEAD CABLING SYSTEM FOR TELECOMMUNICATION SWITCHING CENTER

FIELD OF THE INVENTION

The present invention relates generally to cabling systems for a telecommunications switching center, and more particularly, to an overhead cabling system for a telecommunications switching center which is supported independently of the walls and ceiling of the switching center.

BACKGROUND OF THE INVENTION

In a telecommunications switching center, the telecommunications switching cabinets are typically arranged in a plurality of rows which are separated by aisles. Cabling between cabinets is typically routed either below the floor or through overhead raceways. Overhead raceways for telecommunications switching centers are typically supported from the ceiling of the telecommunications switching center by threaded rods or by a metal framework which itself is supported by threaded rods from the ceiling.

The overhead cabling systems used in the past have numerous shortcomings. One major disadvantage is that the overhead support structure is dependent upon the building structure in which it is installed. It is not unusual, and in fact to be expected, that the building structure will vary from one installation to the next. This variation means that each installation must be customized to work with the particular building structure in which it is installed. The lack of standardization leads to longer engineering and installation time, increased warehouse inventory to maintain parts for all possible installation scenarios, and increased documentation.

Other problems which have been encountered in the past include raceway congestion, inadequate heat dissipation, inconvenient cable transitions from the cable raceway to the switching cabinet, difficulty of installation, and failure to meet structural requirements for seismically active regions.

SUMMARY OF THE INVENTION

The present invention is an overhead cabling system for a telecommunications switching center. The overhead cabling system is designed to be self-supporting, i.e., supported independently of the walls or ceiling of the switching center. Since supports or braces from ceiling structures or walls are not required, installation procedures can be standardized. The use of modular components further reduces installation time.

The overhead cabling system comprises three main assemblies—one or more chute assemblies, a plurality of cable tray assemblies, and one or more cable ladder assemblies. The cable chute assemblies are mounted to the floor adjacent the ends of the cabinet suites. The cable ladder assemblies are supported by the cable chute assemblies and extend cross aisle between two or more cabinet suites. The cable chute assemblies and cable ladder assemblies provide a raceway to route cabling cross aisle between suites. The cable tray assemblies are mounted to the tops of the cabinets which provide the sole support for the cable tray assemblies. The cable tray assemblies route cables from the cable chute assembly to the individual cabinets in a suite. The cable tray assemblies are also used to route cabling between cabinets in the same suite.

The cable tray assemblies are modular and designed to fit on top of a single cabinet. Thus, there is one cable tray assembly for each cabinet in a suite. One advantage of using modular cable tray assemblies is that the cable tray assemblies can be assembled on the switching cabinets at the factory before the cabinets are shipped to the installation site. By pre-installing the cable tray assemblies at the factory, installation time is significantly reduced.

Other objects and advantages of the present invention will become apparent and obvious from a study of the following description and the accompanying drawings which are merely illustrative of such invention.

DETAILED DESCRIPTION OF THE INVENTION

Figure 1:
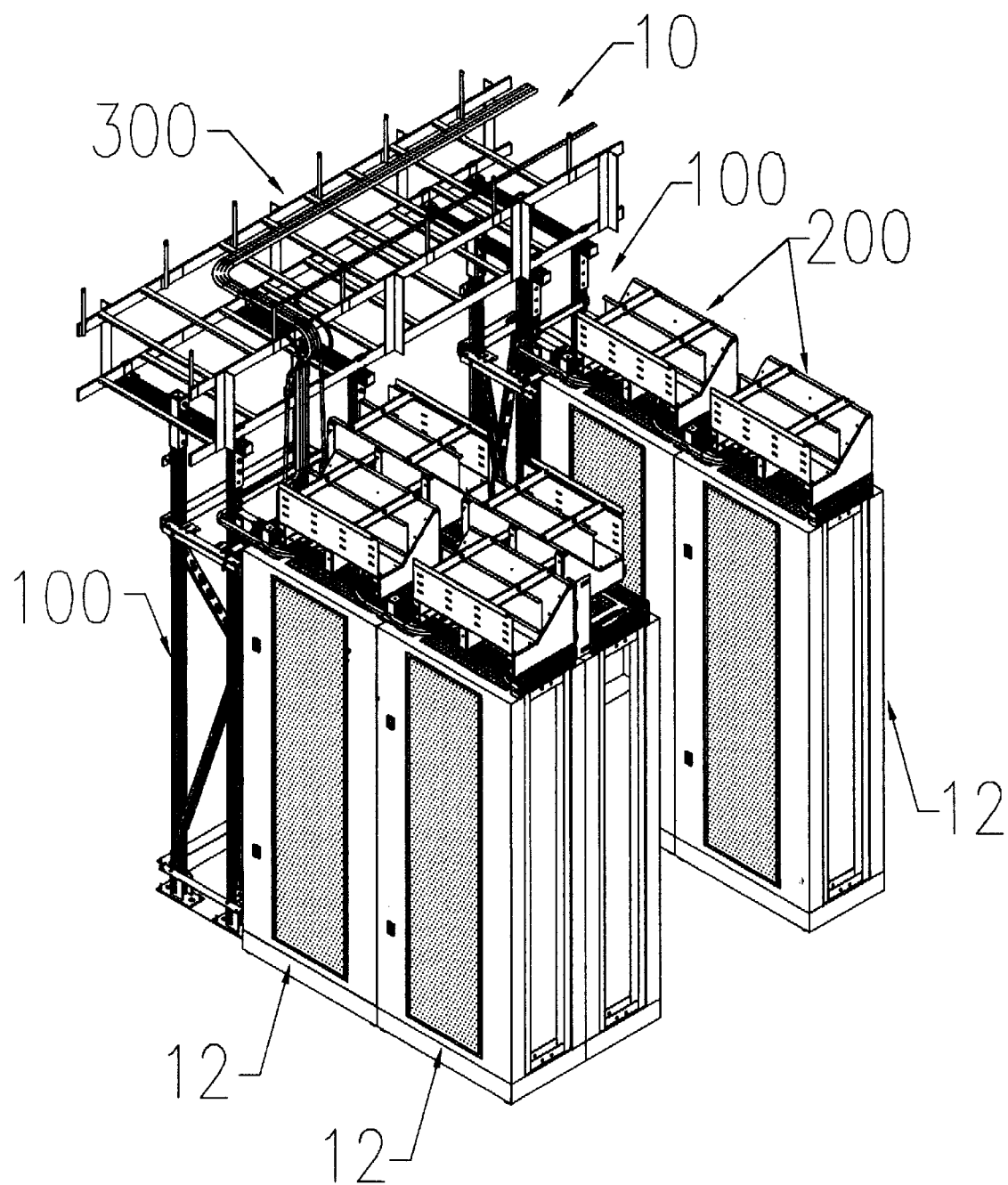
FIG. 1 is a perspective view of the overhead cabling system of the present invention.

Referring now to the drawings, the overhead cabling system of the present invention is shown therein and indicated generally by the numeral 10. The overhead cabling system 10 is designed to provide an overhead cable way for suites of telecommunications switching cabinets 12. For example, the overhead cabling system may be used with the AXE series cabinets manufactured by Ericsson. The switching cabinets 12 are typically arranged in rows with aisles between the rows. A row of side by side cabinets is referred to in the industry as a suite. The most common installation of suites is in a back-to-back configuration. A suite consisting of a single line of cabinets will be referred to herein as a single suite. Two suites in a back-to-back configuration will be referred to as double suites.

The overhead cabling system of the present invention provides an overhead cable way for running cable between cabinets. Using the overhead cable way of the present invention, cabling can be run between cabinets in the same suite or between cabinets in different suites. The overhead cabling system includes three main assemblies—the cable chute assemblies 100, cable tray assemblies 200, and cable ladder assemblies 300. The cable chute assemblies 100 are disposed at the end of each suite of cabinets and extend vertically. The cable chute assemblies are anchored to the floor. The ladder assemblies 300 are supported by the cable chute assemblies 100 and extend across the aisles between cabinet suites. The main purpose of the cable ladder assemblies 300 is to allow cabling to be run cross-aisle between cabinet suites. The cable tray assemblies 200 are mounted to the tops of the cabinets 12 which provide the sole support for the cable tray assemblies 200. The cable tray assemblies 200 are used for running cable lengthwise over a suite of cabinets.

Figure 2:
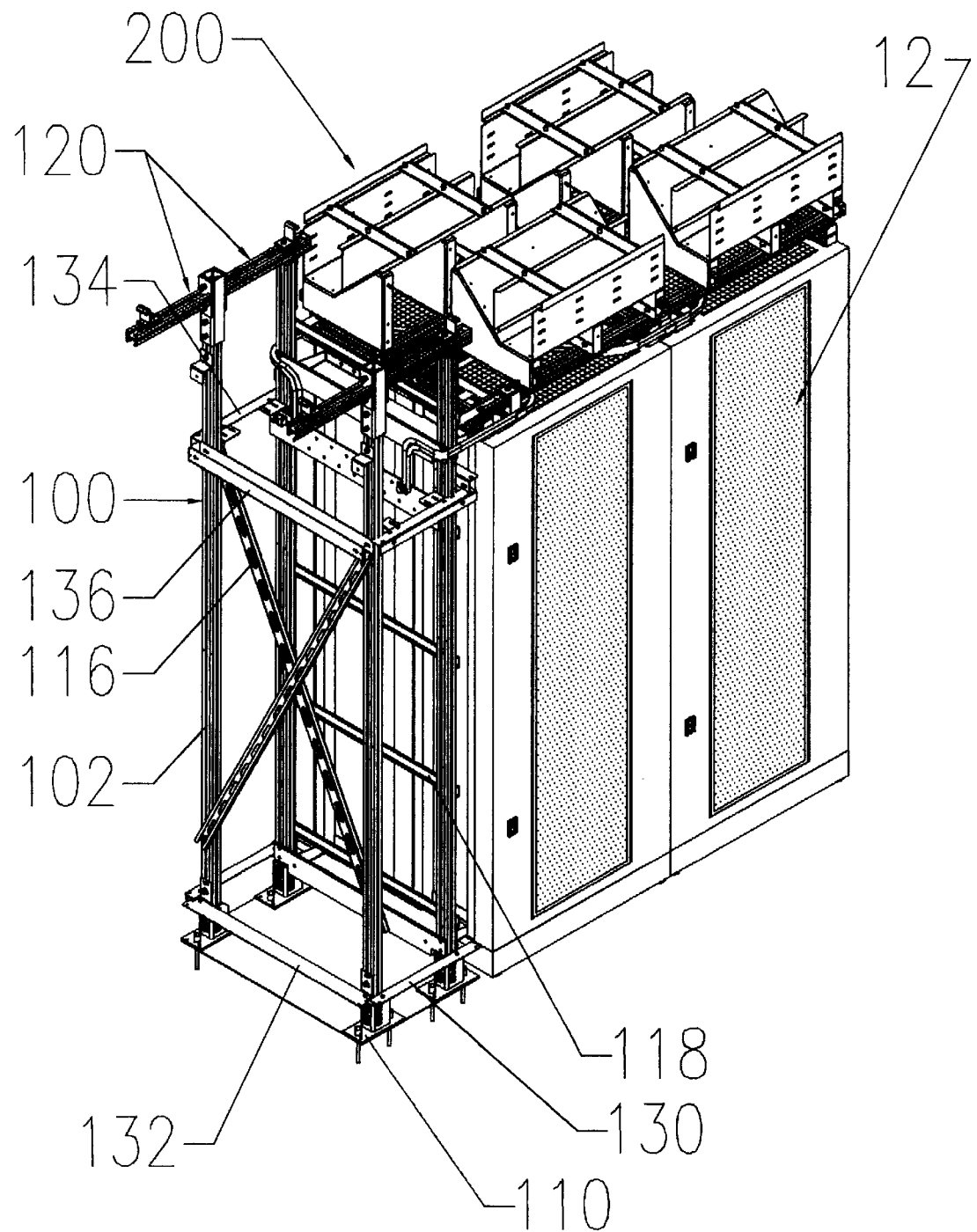
FIG. 2 is a perspective view of a cable chute assembly and cable tray assemblies used in the overhead cabling system.
Figure 3:
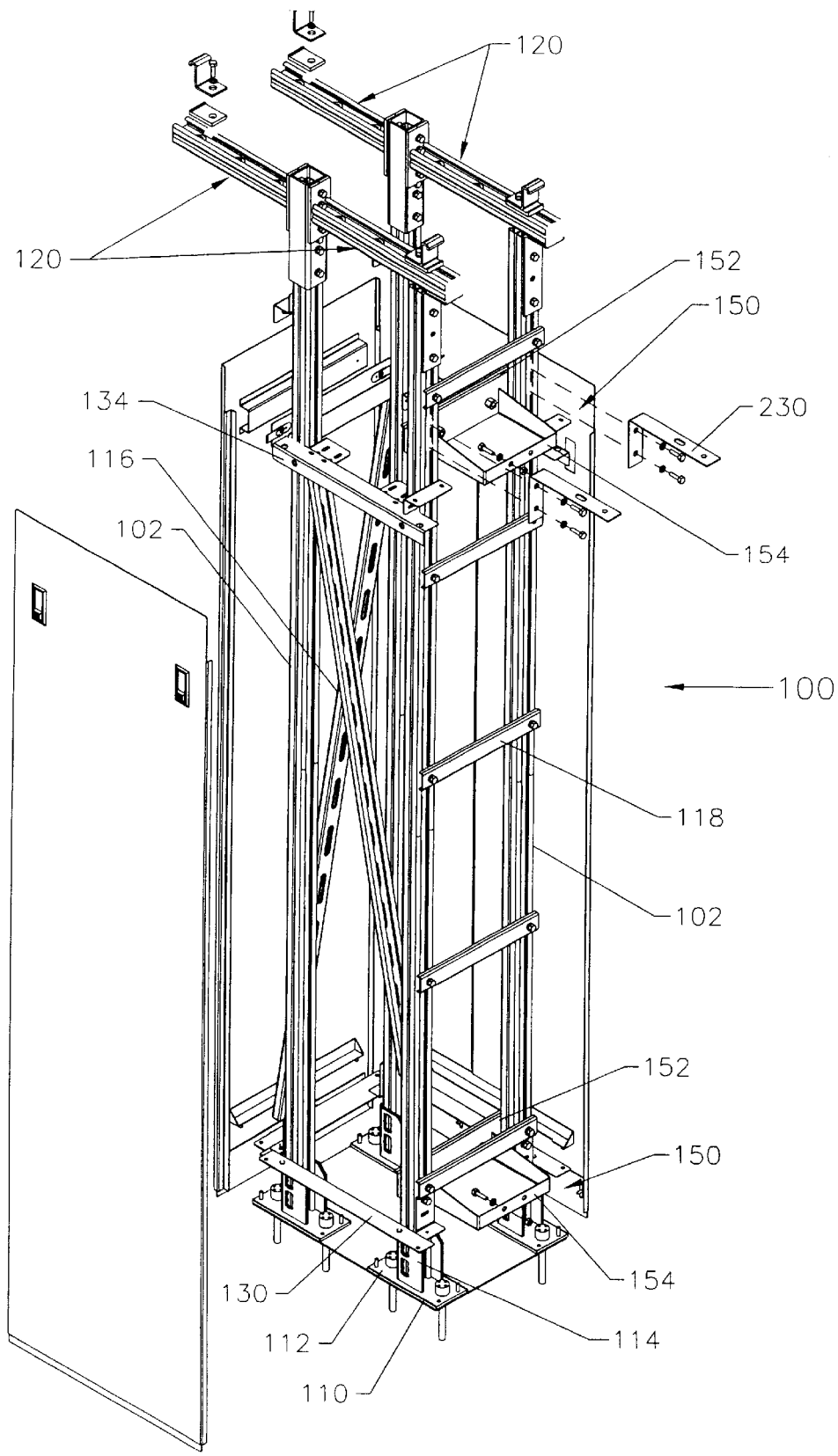
FIG. 3 is a perspective view of a cable chute assembly used in the overhead cabling system.
Figure 4:
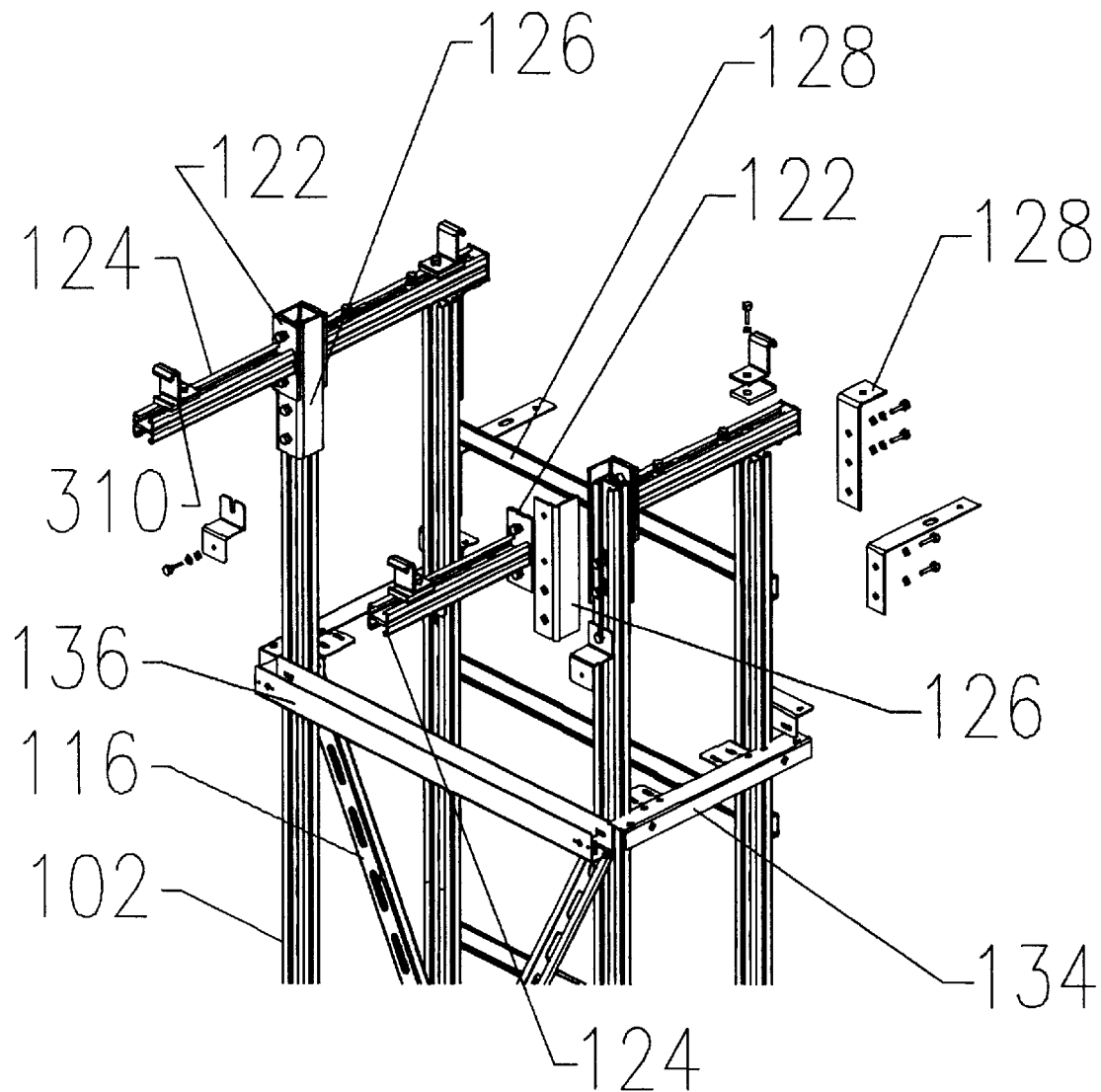
FIG. 4 is a partial perspective view showing the top end of the cable chute assembly.

Referring now to FIGS. 2 through 5, the cable chute assembly 100 is shown in more detail. FIGS. 2 and 4 show a cable chute assembly 100 for a double suites while FIG. 3 shows a cable chute assembly 100 for a single suite. In each case, the construction of the cable chute assembly 100 is essentially the same, the primary difference being the difference in width of the cable chute assembly 100.

Figure 5:
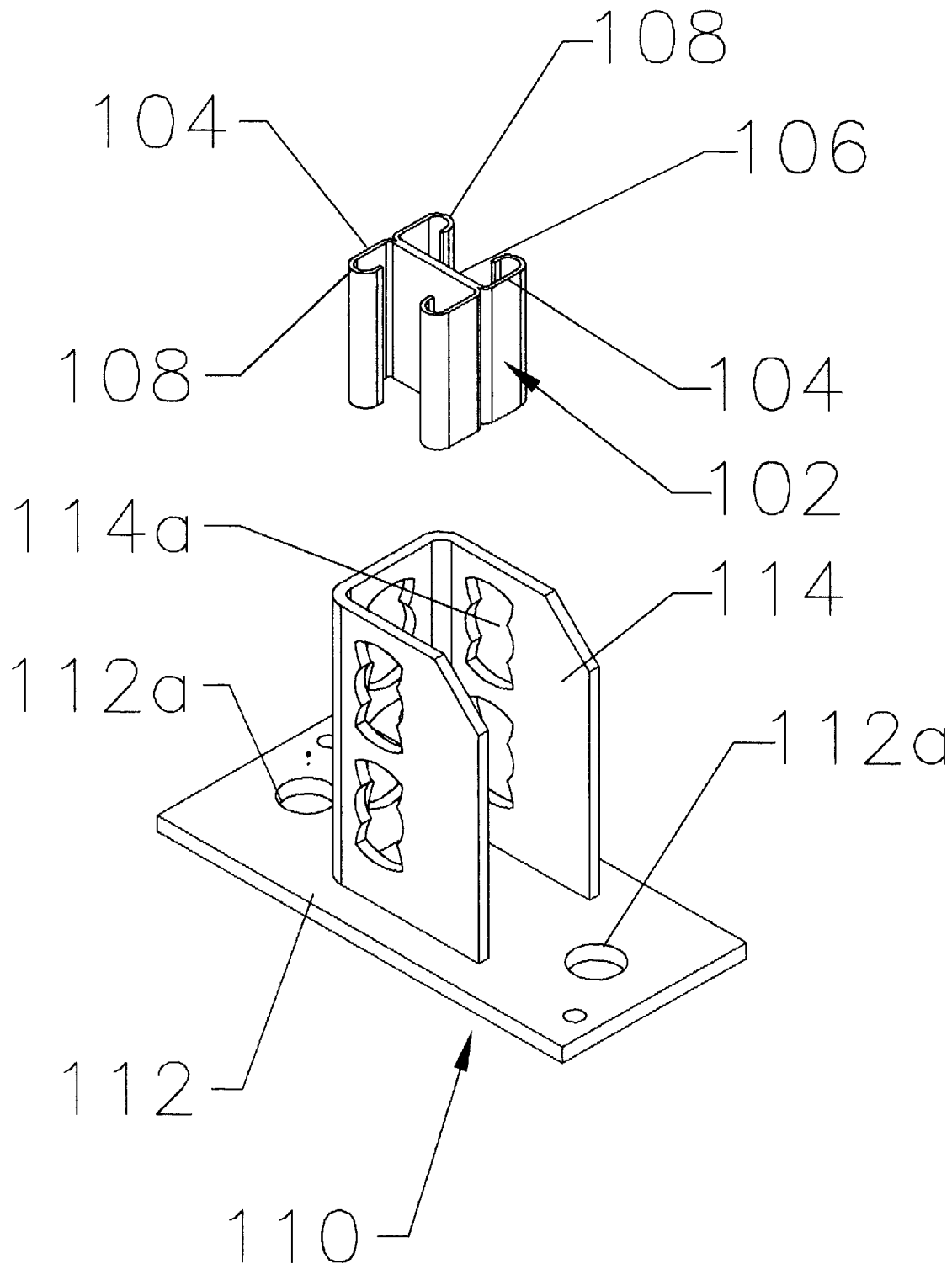
FIG. 5 is a detail perspective view of a support foot used to secure the cable chute assembly to a floor.

The main components of the chute assembly 100 include the vertical support columns 102, support feet 110, cross braces 116, ladder rungs 118, and cable ladder supports 120. The support columns 102 have an I-shaped cross section as seen in FIG. 5. A central web 106 extends between two opposing flanges 104. The edges of the flanges 104 are turned inward to form a lip 108. The edge of the lip 108 is serrated for reasons which will be explained below.

The lower end of the support columns 102 are anchored by the support feet 110. Each support foot 110 comprises a base plate 112 and a channel member 114. Each support foot 110 is secured in place by an anchor bolt (not shown) which extends through anchor holes 112a in the base plate 112 into a structural concrete floor. For most applications, two anchor holes 112a are sufficient. More anchor holes 112a can be provided to give some flexibility in case one hole is not usable.

The channel member 114 has a generally c-shaped configuration. The walls of the channel member 114 include one or more securing holes 114a for releasably securing the lower end of the support columns 102 and the support foot 110.

The support columns 102 are secured in the channel member 114 by a nut and bolt type fastener. Preferably, a nut and bolt fastener known as a push-button manufactured by Hilti Installation Systems of Farmers Branch, Tex. is used. To briefly describe, a push-button comprises a strut nut and bolt which are held together by a spring member. The strut nut is inserted through the openings in the channel member 114 and rotated to engage the serrated lip 108 of the support column 102. The plastic spring member holds the strut nut in contact with the lip 108 of the support column 102 while the bolt is tightened.

Cross braces 116 and ladder rungs 118 are used to brace the support columns 102. The cross braces 116 are relatively long members that extend angularly between support columns 102. The ladder rungs 118 extend perpendicularly between support columns 102 on the side of the chute assembly 100 which butts against the cabinet suite. Both the cross braces 116 and ladder rungs 118 can be secured to the support columns 102 by using push-button fasteners as previously described.

The cable ladder supports 120 are mounted at the top of the support columns 102. The cable ladder supports 120 provide support for the cable ladder assembly 300. There are a total of four cable ladder supports 120 per cable chute assembly 100. Each cable ladder support 120 includes a support bar 124 having a mounting plate 122 at one end thereof. The support bar 124 is similar in cross-section to the support columns 102. Two of the cable ladder supports 120 are mounted to the front support columns 102 and extend forwardly therefrom in cantilever fashion. The remaining two cable ladder supports 120 are mounted to the rear site of the front support columns 102 and extend rearwardly over the top of the rear support columns 102. For purposes of this application, the front of the cable chute means the side facing away from the cabinet suite. The back of the cable chute means the side which butts against the cabinet suite. Angle brackets 126 are disposed between the mounting plate 122 of the cable ladder supports 120 and the front support columns 102. The cable ladder support 120 and angle bracket 126 are secured to the front support columns 102 by push-button fasteners. A pair of L-brackets 128 are used to secure the rearwardly extending cable ladder supports 120 to the rear support columns 102. The L-brackets 128 are secured to both the rear support columns 102 and the cable ladder supports 120 by push-button fasteners.

The cable chute assembly 100 may also include pre-installed alignment brackets 150 which are used during installation to align the chute assembly 100 with the cabinet suite 100. The alignment brackets 150 include a mounting plate 152 and a spacer 154. The mounting plate 152 is secured to the rear support columns 102 of the chute assembly 100 by push-button fasteners. The spacer 154 resembles a tray made of sheet metal and projects from the rear of the chute assembly 100. The rear face of the spacer 154 includes a series of bolt holes which preferably align with pre-drilled holes in the mounting cabinet 12. Thus, the cable chute assembly 100 can be aligned with a cabinet by aligning the bolt holes in the spacer 154 with the corresponding holes in the cabinet 12. It will be apparent that different aligning brackets could be used for different cabinets. Alternatively, a series of bolt holes could be provided in the spacer 154 to match different models of cabinets 12.

In the preferred embodiment of the invention, the chute assemblies 100 are enclosed by a series of dress panels. The dress panel support system includes lower side panel supports 130, upper side panel supports 132, a lower front panel support 134, and an upper front panel support 136. The panel supports 130, 132, 134 and 136 are secured to the support columns 102 by any suitable fastening means. The dress panels mount to the panel supports 130, 132, 134 and 136 in a conventional manner.

Figure 6:
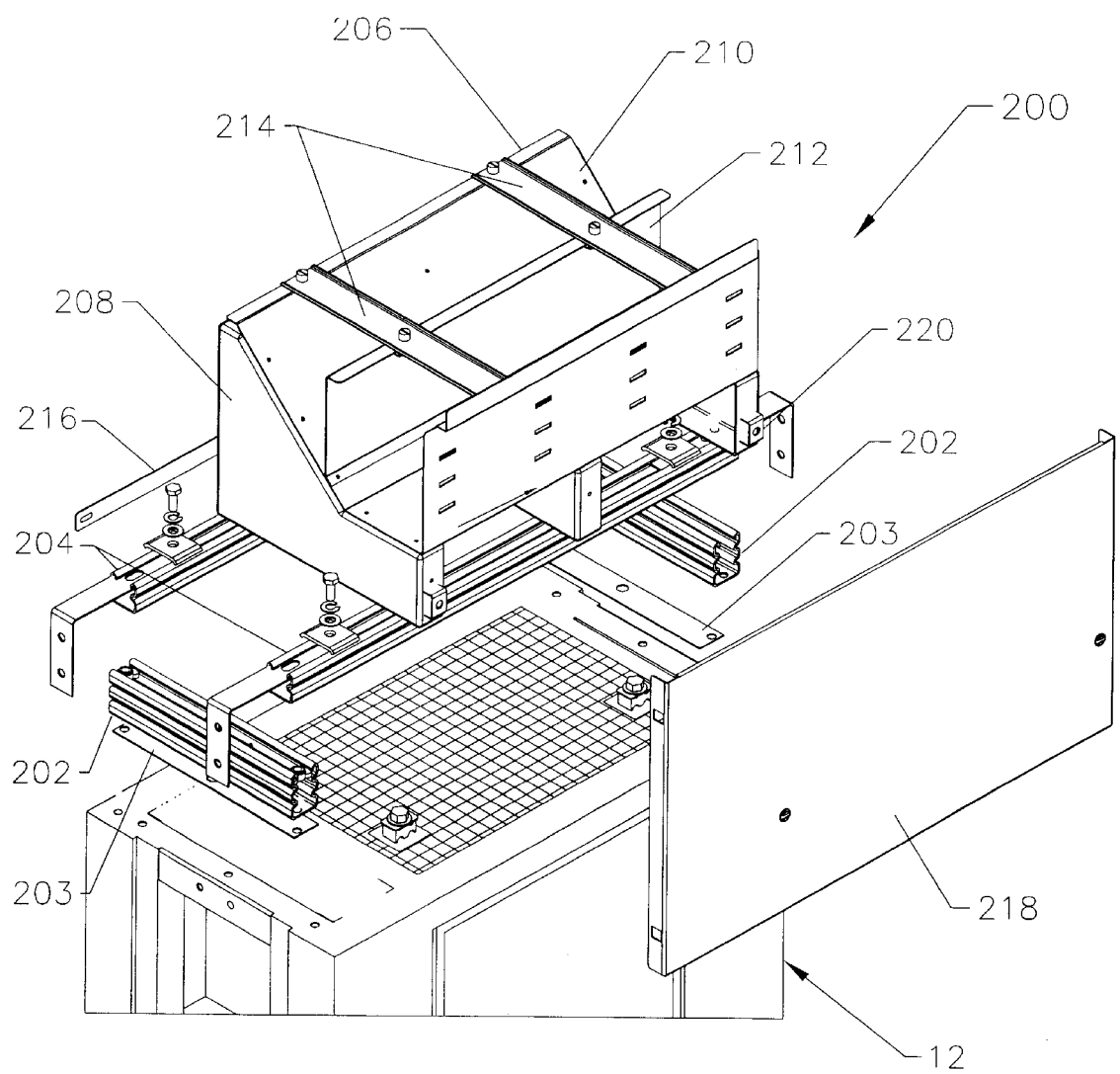
FIG. 6 is an exploded perspective view of a cable tray assembly used in the overhead cabling system.
Figure 7:
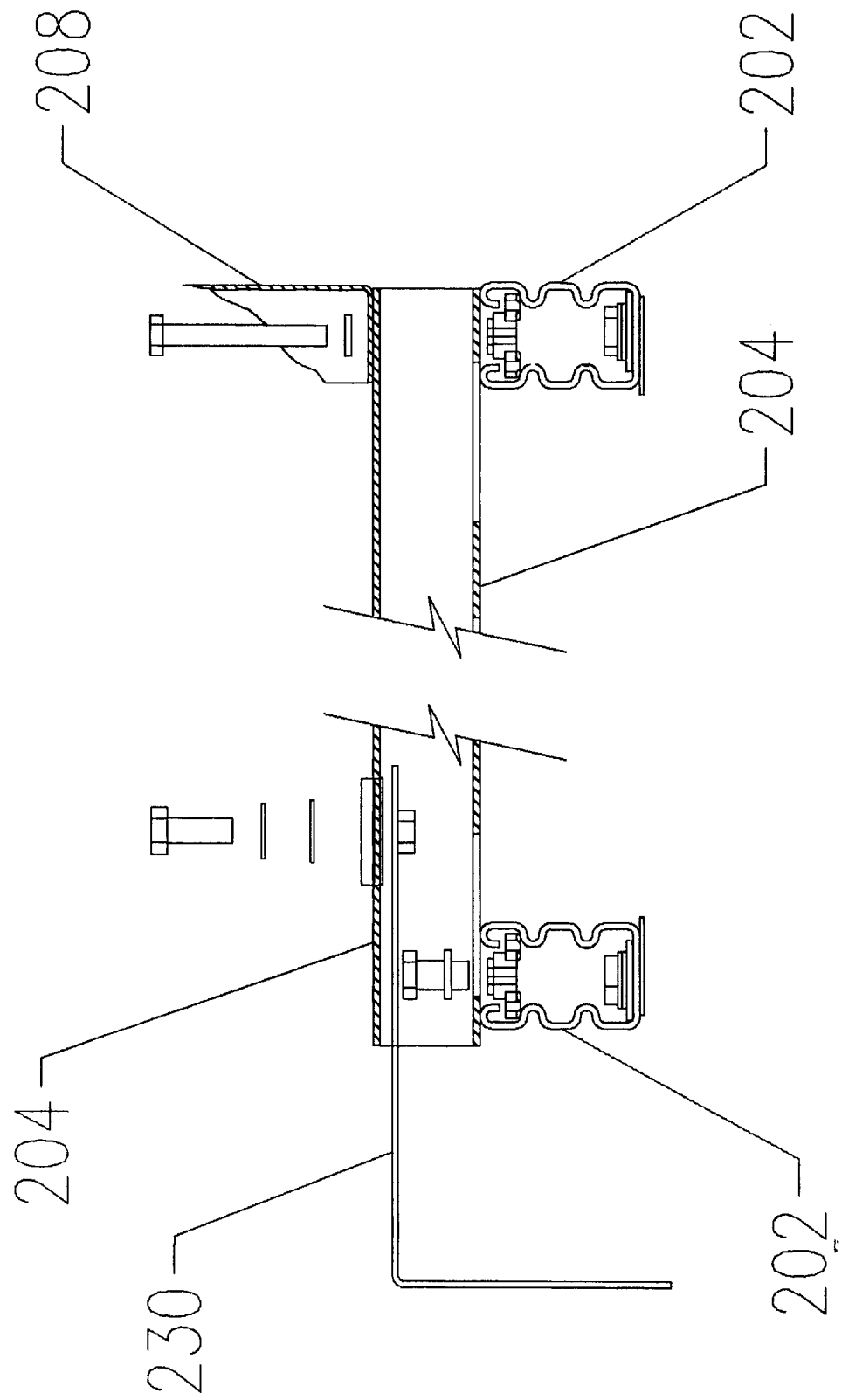
FIG. 7 is a cross-section showing the mounting structure of the cable tray assembly.

Referring now to FIGS. 6 and 7, the cable tray assemblies 200 are shown in greater detail. The cable tray assemblies are designed to mount on top of a switching cabinet 12. In the preferred embodiment of the invention, one cable tray assembly 200 is mounted on top of each switching cabinet 12. This allows the cable tray assemblies 200 to be pre-installed on the cabinets 12 before the cabinets 12 are shipped thereby greatly reducing installation time.

The main components of the cable tray assemblies 200 include a pair of mounting rails 202, a pair of tie rails 204 and a cable tray 206. The mounting rails 202 are mounted on top of the switching cabinet and extend from front to back along each side of the cabinet 12. The mounting rails 202 are preferably insulated from the cabinet 12 by a LEXAN insulator strip 203. The mounting rails 202 may be secured to the switching cabinet 12 by any suitable means such as conventional nut and bolt fasteners.

The tie rails 204 are mounted on top of the mounting rails 202 and extend perpendicular to the mounting rails 202. The tie rails 204 are disposed adjacent the front and back of the switching cabinet 12. The tie rails 204 are secured to the mounting rails 202 by strut nut type fasteners as shown in FIG. 7.

The cable tray 206 mounts on top of the tie rails 204. The cable tray 206 includes a plurality of risers 208, tray 210, and divider 212. The risers 208, tray 210 and divider 212 are preferably made from a sheet metal. The bottom edge of the risers 208 are secured by strut nut fasteners to the tie rails 204. Where the riser 208 aligns with the mounting rails 202, a single strut nut fastener is used to secure the riser 208 and tie rail 204 to the mounting rail. (See FIG. 7). The tray 210 and divider 212 are secured by sheet metal screws to the top edge of the risers 206. The tray 200 includes a front wall 210a, a button wall 210b, and a back wall 210c. The front wall 210a is perpendicular to the bottom wall 210b. The tray 210 is open at both ends as indicated at 216. The back wall 210c is inclined so as to extend upward from the button wall 210b at an acute angle. The inclined back wall 210c helps direct heat away from the cabinet 12. In particular, when two cable tray assemblies 200 are placed on back-to-back cabinets 12, a "chimney effect" is created which promotes cooling of the cabinet 12 and the equipment contained therein.

The divider 212 is secured the inclined back wall 210c and extends generally parallel to the front wall 210a of the tray 210. The divider 212 divides the space within the tray 210 into two compartments. This allows power cables to be segregated from other cables. Straps 214 are attached to the front and back walls of the tray 210 as well as to the divider 212. The straps 214 help hold the front wall 210a and divider 212 in a vertical position.

As previously mentioned, the cable tray assemblies 200 are mounted individually on the top of separate cabinets 12. The cable tray assemblies 200 may be mounted at the factory or on site where the switching cabinets 12 are installed. Once all the switching cabinets 12 and cable tray assemblies 200 in a cabinet suite are in place, the cable trays 210 are connected together with a bonding strap 216 to ensure that they are on the same electrical plane. The bonding strap 216 is simply a metal strap which is bolted or screwed to the rear edge of the risers 208. One end of the bonding strap 216 is connected to the end riser 208 of one cable tray assembly 200, while the opposite end of the bonding strap 216 is connected to the end riser 208 on the adjacent cable tray assembly 200. Each adjacent pair of cable tray assemblies 200 are connected in this manner using a bonding strap 216 until the entire line of cable tray assemblies 200 are joined.

The cable tray assemblies 200 adjacent the cable chute assemblies 100 are also secured to the cable chute assembly 100. One leg of an L-bracket 230 is fastened to the tie rail 204 of the cable tray assembly 200, as shown in FIG. 7. The other leg is fastened to one of the rear support columns 102 of the chute assembly 100, as shown best in FIG. 3. This ensures that the cable tray assemblies 200 and cable chute assemblies 100 are on the same ground plane.

A dress panel 218 attaches to the front of the cable tray 206 to conceal the cabling and provide an improved aesthetic appearance. The dress panel 218 is designed to hang on the front wall of the cable tray 206. Panel hangers 220 are also attached to the front edge of the end risers 208. Quarter-turn connectors can be inserted through openings in the dress panel 218 to engage the panel hangers 220.

Figure 8:
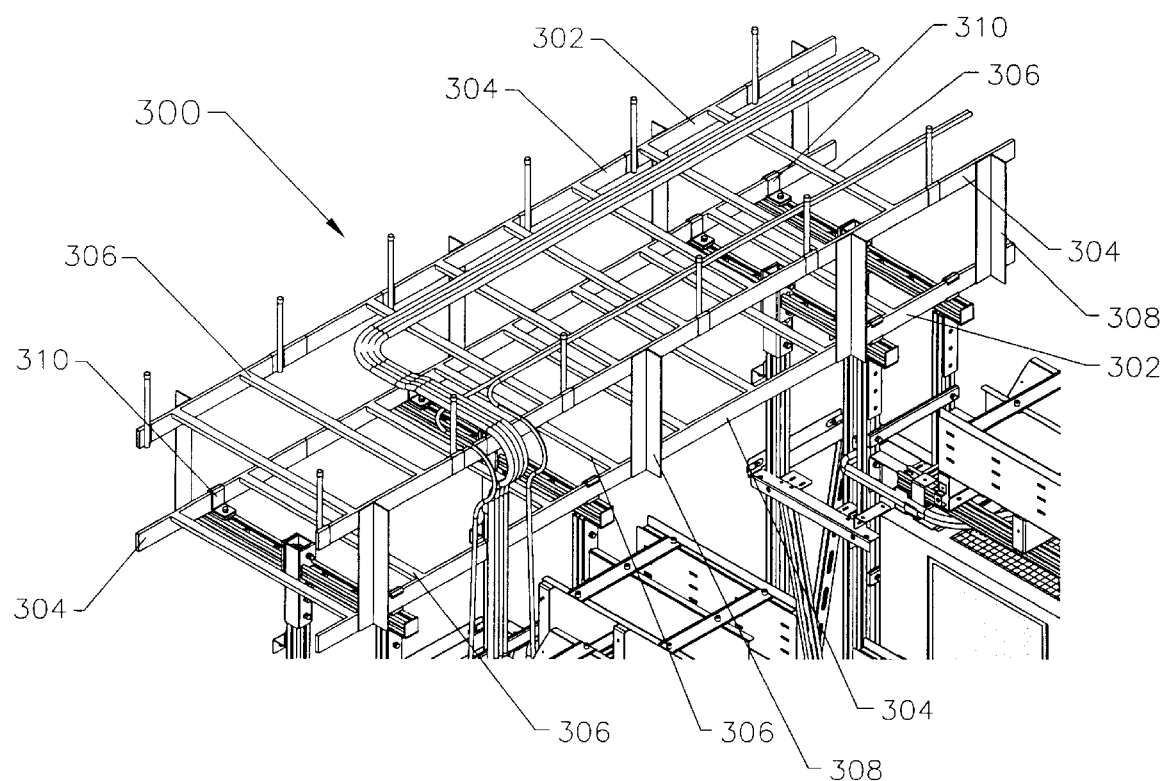
FIG. 8 is a perspective view of the cable ladder assembly used in the overhead cabling system.

Referring now to FIG. 8, the cable ladder assembly 300 is shown. The cable ladder assembly 300 is supported by the chute assembly 100. The cable ladder assemblies 300 extend above the aisles between cabinet suites at one or both ends of the suite. Thus, the cable ladder assemblies 300 allow cross aisle cabling between cabinet suites.

The cable ladder assembly 300 comprises two horizontal ladders 302 disposed in spaced relation to one another. Each ladder comprises two parallel rails 304 having a plurality of rungs 306 extending between the rails 304. The ladders 302 are held in spaced relation by vertical spacer bars 308 which are joined with the rails 304 of the ladders 302.

The cable ladder assembly 300 rests on top of the cable ladder supports 120 of the cable chute assembly 100. The cable chute assembly 100 is secured to the cable ladders supports 120 by ladder clamps 310. The ladder clamps 310 are secured by a bolt and strut nut to the cable ladder support 120. These ladder clamps 310 include a hook-like element which engages a ladder rail 304.

The primary advantage of the overhead cabling system 10 of the present invention is that it does not require support from ceilings or walls. Both the cable chutes and cable tray assemblies are modular and can be completely assembled in a factory and shipped to the installation site. The ease of installation of supports and raceways coupled with the systems modularity significantly reduces engineering and installation time.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

We claim:

1. An overhead cabling system for a telecommunications switching center having a plurality of switching cabinets arranged in rows, comprising:
    a) a plurality of cable chute assemblies mounted to a floor adjacent an end of selected rows of said cabinets, wherein said chute assemblies extend vertically from the floor;
    b) a plurality of cable tray assemblies mounted on top of said selected rows of said cabinets; and
    c) at least one cable ladder assembly supported by said chute assemblies in spaced relationship to said floor, said cable ladder assembly extending between at least two cable chute assemblies.

2. The overhead cabling system according to claim 1 wherein said cable tray assemblies include at least two mounting rails which mount on top of said cabinets, and said cable tray assembly supported in spaced relation above the top of the cabinet by said mounting rails.

3. The overhead cabling system according to claim 2 wherein said cable tray assemblies include a generally flat bottom wall, an inclined rear wall, a front wall, and two open ends.

4. The overhead cabling system according to claim 3 wherein said cable tray assemblies further include at least one divider extending generally parallel to said front wall for dividing the cable tray assemblies into at least two separate compartments.

5. A cable tray assembly adapted to mount on top of a switching cabinet comprising:
    a) a cable tray including a bottom wall, a front wall, a back wall and two open ends; and
    b) a mounting structure adapted to mount on top of a single switching cabinet for supporting said cable tray in spaced relation to the top of said single switching cabinet, said mounting structure including a pair of mounting rails adapted to be secured to the top of said single switching cabinet in spaced relationship to one another, and a pair of tie rails extending between said mounting rails, said cable tray being secured on top of said tie rails.

6. The cable tray assembly according to claim 5 further including at least one divider in said cable tray extending generally parallel to said front wall for dividing said tray into at least two separate compartments.

7. A cable tray assembly adapted to mount on top of a switching cabinet comprising:
    a) a cable tray including a bottom wall, a front wall, an inclined back wall and two open ends; and
    b) a mounting structure adapted to mount on top of a single switching cabinet for supporting said cable tray in spaced relation to the top of said cabinet.

8. A cabinet system for telecommunications equipment comprising:
    a) a plurality of cabinets, each having a top surface, arranged in side by side relationship to form a row of said cabinets;
    b) a plurality of modular cable trays, each including a back wall, mounted individually to the top surface of respective ones of said cabinets in said row of said cabinets so that each cable tray is supported by one of said cabinets, wherein said back wall of each cable tray is inclined.

* * * * *